(No Model.)
J. A. EGGINTON.
GLASS COVER FOR PICTURES, &c.
No. 370,133. Patented Sept. 20, 1887.
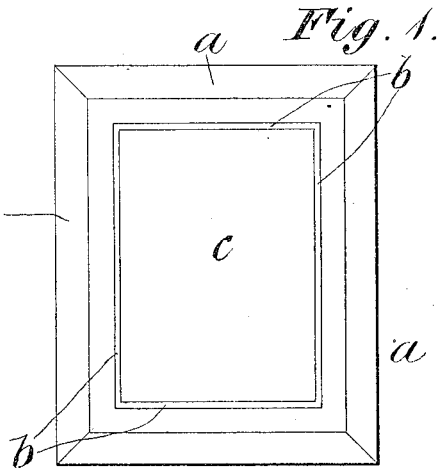
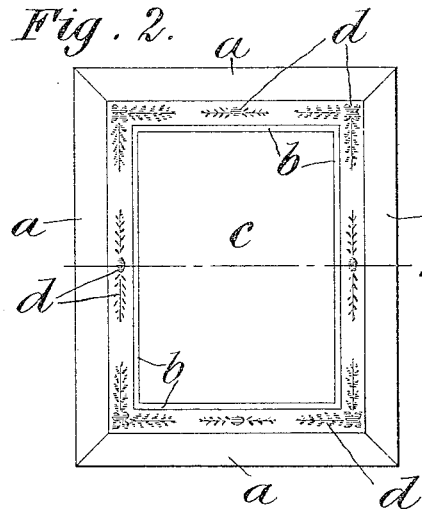
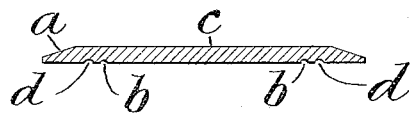
Witnesses.
W. Décarie
A. A. Simpson
Inventor.
Joseph A. Egginton
By his Attorney
Charles G. Simpson
N. PETERS, Photo-Lithographer, Washington, D. C.

United States Patent Office.

JOSEPH AUGUSTUS EGGINTON, OF MONTREAL, QUEBEC, CANADA.

GLASS COVER FOR PICTURES, &c.

SPECIFICATION forming part of Letters Patent No. 370,133, dated September 20, 1887.

Application filed August 16, 1887. Serial No. 247,079. (No model.)

*To all whom it may concern:*

Be it known that I, JOSEPH AUGUSTUS EGGINTON, of the city of Montreal, in the district of Montreal and Province of Quebec, Canada, manufacturer of cut glass, have invented new and useful Improvements in Glass Covers for Pictures, &c.; and I do hereby declare that the following is a full, clear, and exact description of the same.

This invention has reference to the formation of glasses for covering pictures, sometimes called in the trade "mats."

In the drawings hereunto annexed similar letters of reference indicate like parts.

Figure 1 is a plan of a glass picture-cover embodying my invention. Fig. 2 is a plan of a glass picture-cover, the same as shown in Fig. 1, but having ornamental cutting or engraving or etching upon the under side thereof. Fig. 3 is a section on line $x$, Fig. 2.

I take a piece of glass of the desired dimensions and form upon the front of it the bevels $a$, and upon the back of it cut, engrave, or etch the margin-lines $b$, giving any desired field, $c$, for the picture. The lines $b$ are cut, engraved, or etched on the back of the glass, and, if desired, any ornaments or pattern, $d$, may be further similarly formed thereon. The whole of the margin, including the lines $b$, is silvered to form it into looking-glass or mirrored back.

The formation of the lines $b$ upon the glass is an important feature of this invention, as it not only adds very materially to the appearance of the glass, but also enables the silvering to be cut to a clean sharp line or edge around the field $c$. As shown in the drawings, the field $c$ is rectangular. Were it desired to form a field, $c$, elliptical or of other configuration, the lines $b$ will be formed in accordance therewith, and in fact the whole configuration of the glass cover itself may be whatever is desired, although it is only shown as rectangular in the drawings hereunto annexed.

The bevels $a$ and ornaments or pattern $d$ may be omitted, if desired.

What I claim, and wish to secure by Letters Patent, is as follows:

1. As an improved article of manufacture, a glass cover for pictures provided with marginal lines $b$, formed about the field for the picture, and a mirrored or silvered back formed about or around the field for the picture, &c., the whole substantially as described.

2. As an improved article of manufacture, a glass cover for pictures provided with marginal lines $b$, formed about the field for the picture, and a mirrored or silvered back formed about or around the said field for the picture, &c., and also provided with bevels $a$, the whole substantially as described.

3. As an improved article of manufacture, a glass cover for pictures provided with marginal lines $b$, formed about the field for the picture, and a mirrored or silvered back formed about or around the said field for the picture, &c., and also provided with ornamental cutting, engraving, or etching, $d$, and bevels $a$, the whole substantially as shown and described.

JOSEPH AUGUSTUS EGGINTON.

Witnesses:
CHARLES G. C. SIMPSON,
J. A. GRENIER.